(12) United States Patent
Busse et al.

(10) Patent No.: US 11,852,250 B2
(45) Date of Patent: Dec. 26, 2023

(54) ADJUSTABLE SPOOL VALVE FOR A DIGITAL VALVE CONTROLLER

(71) Applicant: Fisher Controls International LLC, Marshalltown, IA (US)

(72) Inventors: Brad Busse, Marshalltown, IA (US); Stephen D. Gerbracht, Ames, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 17/717,988

(22) Filed: Apr. 11, 2022

(65) Prior Publication Data

US 2023/0323963 A1 Oct. 12, 2023

(51) Int. Cl.
*F16K 11/07* (2006.01)
*F16K 27/04* (2006.01)
*F16K 31/02* (2006.01)

(52) U.S. Cl.
CPC ...... *F16K 11/0708* (2013.01); *F16K 11/0712* (2013.01); *F16K 27/041* (2013.01); *F16K 31/02* (2013.01); *F16K 2200/3051* (2021.08)

(58) Field of Classification Search
CPC . F16K 11/07; F16K 11/0708; Y10T 137/8671
See application file for complete search history.

(56) References Cited

U.S. PATENT DOCUMENTS

| | | | | |
|---|---|---|---|---|
| 3,756,280 | A * | 9/1973 | Parquet | F16K 11/065 137/625.25 |
| 5,165,448 | A | 11/1992 | Handte | |
| 10,753,376 | B2 | 8/2020 | Hori et al. | |
| 11,300,222 | B1 * | 4/2022 | Higgins | F16K 31/1223 |
| 2004/0000347 | A1 * | 1/2004 | Shin | F15B 13/0402 137/625.69 |
| 2016/0290698 | A1 * | 10/2016 | Dodson | B61C 17/02 |
| 2017/0067569 | A1 * | 3/2017 | Ballenger | F15B 13/0405 |
| 2017/0138489 | A1 * | 5/2017 | Winkler | B23P 15/001 |

* cited by examiner

*Primary Examiner* — Kelsey E Cary
(74) *Attorney, Agent, or Firm* — Quarles & Brady LLP

(57) ABSTRACT

A spool valve includes a sleeve with multiple axial ports positioned over the length of the sleeve and an adjustable spool component that couples neighboring ones of the sleeve's ports based on a position of the spool component within the sleeve. The adjustable spool component includes multiple sub-components having positions that are adjustable relative to each other such that the dimensions of the spool component can be tailored to precisely match the corresponding sleeve.

14 Claims, 10 Drawing Sheets

ADJUSTABLE SPOOL VALVE FOR A DIGITAL VALVE CONTROLLER

FIELD OF THE INVENTION

This disclosure relates generally to digital valve positioners, and, more specifically, to an improved spool valve component for a digital valve positioner.

BACKGROUND

FIG. 1 illustrates a typical control valve arrangement 5 that includes a control valve 8, a pneumatic actuator 12, and a digital valve controller (DVC) 10. The control valve 8 is installed within a conduit (e.g., a pipe) and includes a control member that is adjusted (e.g., up and down in the case of the sliding stem valve depicted in FIG. 1) to adjust the flow of fluid through the valve 8. The pneumatic actuator 12 is coupled to the stem of the valve 8 and is configured to convert a pneumatic pressure driving force into a motion (e.g., a linear motion in the case of the sliding stem valve depicted in FIG. 1) that is imparted to the valve 8's stem to modulate the position of the valve 8's control member between open and closed positions. The DVC 10 receives a signal that is indicative of a desired valve position (e.g., 0% to 100% open) that is generally communicated to the DVC 10 as a hardwired analog signal, such as a 4-20 mA signal that is transmitted via a pair of wires that are connected to terminals within the DVC 10's terminal box 30. The DVC 10 implements a feedback control loop to adjust the pneumatic output that it delivers to the actuator 12 until the valve position (which is measured directly by the digital valve controller 10) matches the desired valve position. The present disclosure is related to an improved component of the DVC 10.

SUMMARY

An adjustable spool component for a spool valve may include a center component having a center sealing portion, a first center chamber portion, and a second center chamber portion, where the first and second center chamber portions are on opposite sides of the center sealing portion; a first end component having a first end sealing portion and a first end chamber portion; and a second end component having a second end sealing portion and a second end chamber portion. The first end component may be positioned on a first side of the center component, the second end component may be positioned on a second side of the center component that is opposite the first side, and a position of each of the first and second end components may be adjustable relative to the center component.

In an embodiment, the center component may include a first threaded protrusion and a second threaded protrusion; the first end component may include a first threaded recess; and the second end component may include a second threaded recess. The first threaded recess may be configured to receive the first threaded protrusion and the second threaded recess may be configured to receive the second threaded protrusion, and the position of the first end component may be adjustable relative to the center component based on an amount of engagement between the first threaded protrusion and the first threaded recess and the position of the second end component may be adjustable relative to the center component based on an amount of engagement between the second threaded protrusion and the second threaded recess. The first and second end components may include a set screw bore that is configured to receive a set screw.

In an embodiment, the first end component may include a first axial through-bore; the second end component may include a second axial through-bore; and the center component may include a center axial through-bore. The first end component, the second end component, and the center component may be positioned on a rod that extends through the first axial through-bore, the second axial through-bore, and the center axial through-bore. Each of the first end component, the second end component, and the center component may include a set screw bore that is configured to receive a set screw. The rod may be a threaded rod, and the spool component may include lock nuts that are each threaded onto the threaded rod and positioned adjacent to one of the center component, the first end component, or the second end component.

In an embodiment, the adjustable spool component may further include a first spacer positioned between the first end component and the center component; and a second spacer positioned between the second end component and the center component. The adjustable spool component may additionally include multiple disc springs that are positioned along the rod. The rod may include threaded ends, and an adjusting nut may be positioned on one of the threaded ends of the rod such that the position of each of the first and second end components may be adjustable relative to the center component by adjusting the position of the adjusting nut to compress or expand the disc springs. The first end component, the second end component, and the center component may each include one or more cavities to receive a sealing member to prevent leakage between adjacent chambers of the spool component.

In an embodiment, the center component may include a first center protrusion and a second center protrusion; the first end component may include a first end protrusion; and the second end component may include a second end protrusion. The first end protrusion and the first center protrusion may be configured to be inserted into a first collar, the second end protrusion and the second center protrusion may be configured to be inserted into a second collar, and the position of the first end component may be adjustable relative to the center component based on a degree of insertion of the first end protrusion and the first center protrusion in the first collar and the position of the second end component may be adjustable relative to the center component based on a degree of insertion of the second end protrusion and the second center protrusion in the second collar.

A spool valve may include a sleeve having multiple ports that are positioned at different axial locations along the sleeve; and an adjustable spool component that includes a center component having a center sealing portion, a first center chamber portion, and a second center chamber portion, where the first and second center chamber portions are on opposite sides of the center sealing portion; a first end component having a first end sealing portion and a first end chamber portion; and a second end component having a second end sealing portion and a second end chamber portion. The first end component may be positioned on a first side of the center component, the second end component may be positioned on a second side of the center component that is opposite the first side, and a position of each of the first and second end components may be adjustable relative to the center component.

One of the ports may be configured to be coupled to a pneumatic supply pressure. Two or more of the ports may be configured to be coupled to the atmosphere surrounding the spool valve. Two or more of the ports may be configured to be coupled to cylinders of a pneumatic actuator. The position of the adjustable spool component within the sleeve may be dependent upon a pneumatic signal that is supplied by a digital valve controller.

In an embodiment, the first end component, the second end component, and the center component may be positioned on a rod that extends through a first axial through-bore that extends through the first end component, a second axial through-bore that extends through the second end component, and a center axial through-bore that extends through the center component. The adjustable spool component may additionally include multiple disc springs that are positioned along the rod and an adjusting nut positioned on a threaded end of the rod. The position of each of the first and second end components may be adjustable relative to the center component by adjusting the position of the adjusting nut to compress or expand the plurality of disc springs.

DETAILED DESCRIPTION OF THE INVENTION

Figure 1:
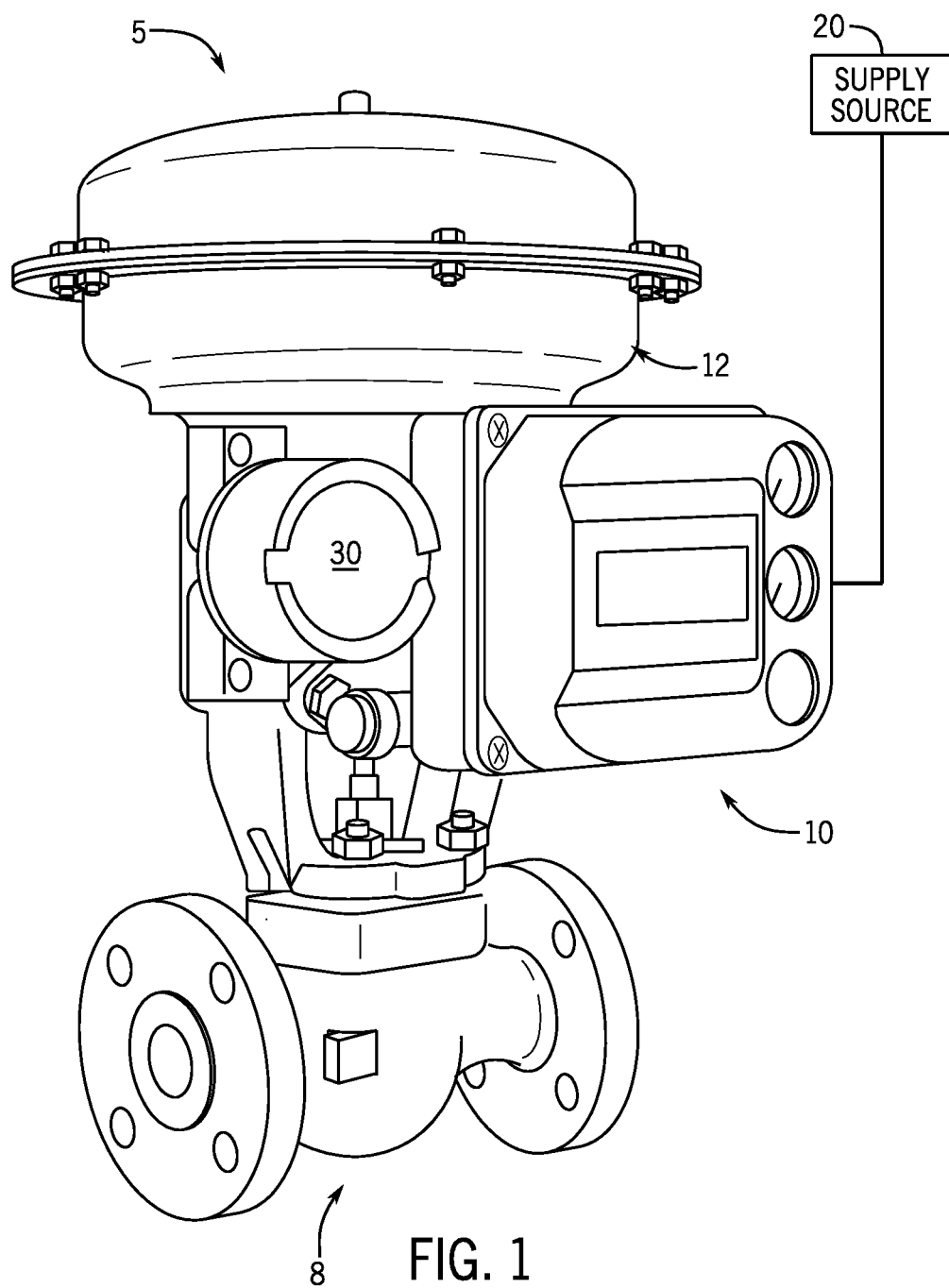
FIG. 1 is a perspective view of a control valve arrangement that includes a control valve, a pneumatic actuator, and a digital valve controller.
Figure 2:
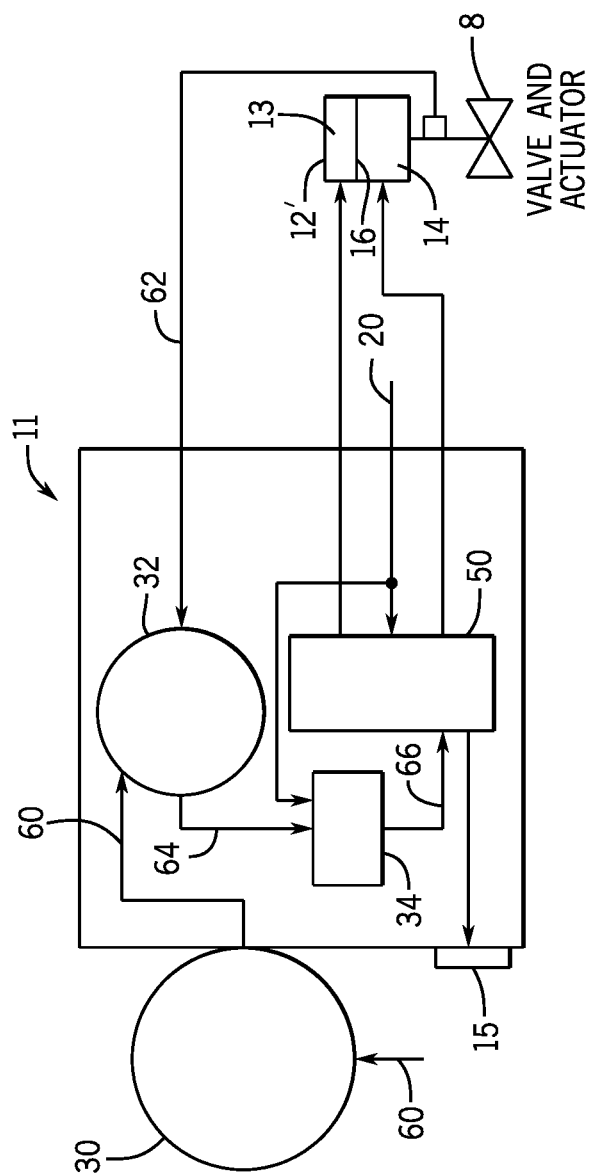
FIG. 2 is a block diagram schematic that illustrates various components of a digital valve controller, and the functionality of such components in a control valve arrangement, in accordance with an embodiment of this disclosure.

FIG. 2 illustrates a schematic of the internal components of a digital valve controller (DVC) 11 that includes a spool valve component 50 according to the teachings of this disclosure. As described above with respect to DVC 10, DVC 11 includes a terminal box 30 that houses electrical terminals to which signal wires are connected. The signal wires include those carrying a signal 60 representative of the desired valve position (i.e., valve position setpoint). A printed circuit board (PCB) 32 receives both the valve position setpoint signal 60 as well as a signal 62 representative of the actual valve position (which is measured directly by DVC 11 instrumentation). The PCB 32 includes a microcontroller and associated circuitry (collectively, "control circuitry") for executing the functionality of the DVC 11. In particular, the PCB 32 control circuitry executes a control algorithm to adjust a drive signal 64 that is output to the DVC 11's current-to-pneumatic (I/P) transducer 34. The I/P transducer 34 receives a pneumatic supply 20 (e.g., a 60-90 psig instrument air supply), which it regulates to the pneumatic drive signal 66 that it outputs based on the electric drive signal 64, typically as a simple linear translation (e.g., a 4-20 mA electric drive signal is converted to a 3-15 psig pneumatic drive signal). The pneumatic drive signal 66 exerts a force on a drive piston within the spool valve 50, which, in turn, modulates the position of a spool 52 (not shown in FIG. 2) within a sleeve 54 (not shown in FIG. 2) of the spool valve 50.

The spool valve 50 is configured to interface with a double acting actuator 12' (i.e., an actuator that utilizes pneumatic pressure to both open and close the connected valve), and it includes ports that are coupled to the pneumatic supply 20, a first cylinder 13 of actuator 12', a second cylinder 14 of actuator 12', and the atmosphere surrounding the DVC 11 via vent 15. The positioning of the spool 52 within the spool valve 50, based on the pneumatic drive signal 66 applied to the spool valve 50's drive piston 56 (not shown in FIG. 2), couples various ones of the spool valve 50's ports, which, in turn, adjust the pressure in the first and second cylinders 13, 14 of the actuator 12' to control the position of the connected valve 8.

Figure 3:
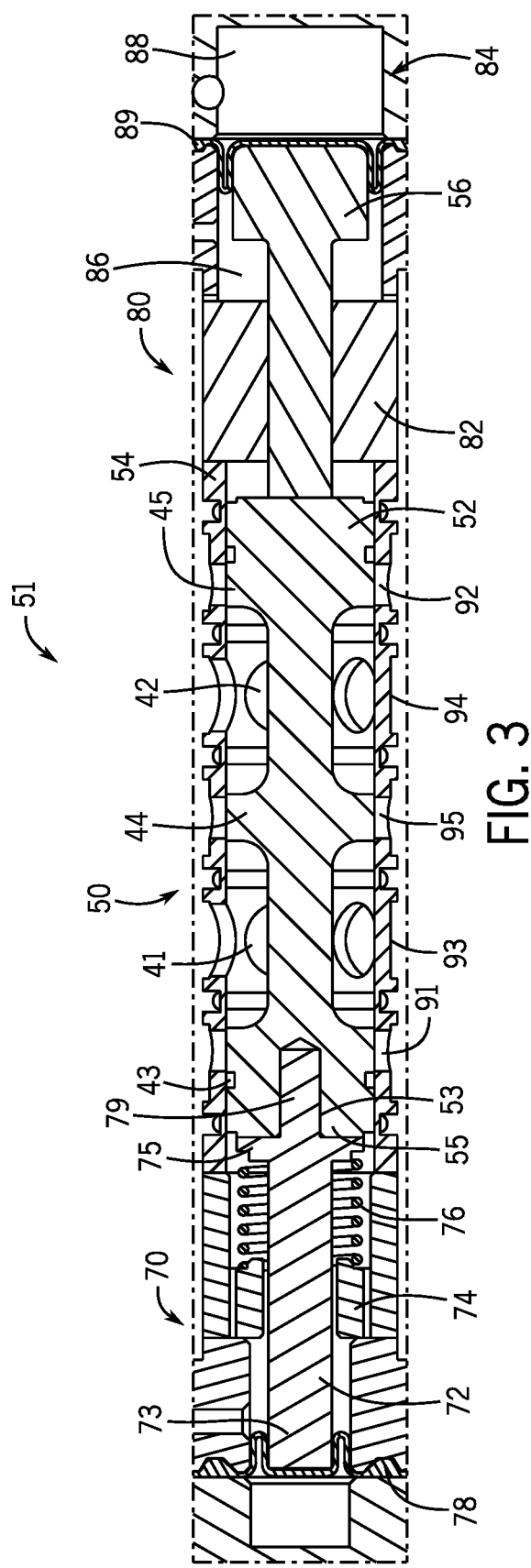
FIG. 3 is a cross-sectional view of a spool valve assembly of a digital valve controller in accordance with an embodiment of this disclosure.

FIG. 3 is a cross-sectional view of a spool valve assembly portion 51 of the DVC 11 that includes the spool valve 50. The spool valve 50 is positioned between a spring module 70 and a drive module 80. The drive module 80 includes the drive piston 56, a drive piston bearing 82, and a drive cylinder 84 that is separated into a spool portion 86 and a drive portion 88 by a diaphragm 89. The drive portion 88 of the drive cylinder 84 receives the pneumatic drive signal 66 from the I/P converter 34. The pressure in the drive portion 88 operates on the diaphragm 89 and the head of the drive piston 56 to urge the drive piston toward the spool valve 50 (i.e., left in the orientation depicted in FIG. 3).

The spring module 70 includes a spring piston 72, a spring piston bearing 74, a spring 76, and a diaphragm 78. The spring piston 72 includes a cylindrical portion 73 that is received within the spring piston bearing 74, a flange 75 that abuts a spring end 55 of the spool 50, and a protruding member 79 that is received within a receptacle 53 of the spring end 55 of the spool 52. The spring 76 is positioned between the spring piston bearing 74 and the flange 75 of the spring piston 72. Because the spring piston bearing 74 is mechanically prevented from moving away from the spool valve 50 (i.e., left in the orientation depicted in FIG. 3), the spring 76 urges the spring piston 72, and thus the spool 52, toward the drive module 80 (i.e., right in the orientation depicted in FIG. 3). The diaphragm 78 is coupled to and moves in conjunction with the spring piston 72.

The spring module 70 and the spool portion 86 of the drive module 80 are fluidly coupled such that the opposing ends of the spool 52 are pressure balanced. The diaphragms 78, 89 contain the balancing pressure within the spool valve assembly 51. As a result of the balanced pressure on each side of the spool 52, the position of the spool 52 within the sleeve 54 is determined based on the balance of the force exerted by the compressed spring 76 that urges the spool 52 in the direction of the drive module 80 and the force exerted by the pneumatic drive signal 66 pressure operating on the head of the drive piston 56 that urges the spool 52 in the direction of the spring module 70. At a midpoint in the pressure range of the pneumatic drive signal 66, these forces are balanced and the spool 52 is stationary in the sleeve 54. Below the midpoint pneumatic drive signal value, the force exerted by the spring 76 overcomes the force exerted by the pneumatic drive signal 66, and the spool 52 moves toward the drive module 80 (i.e., right in the orientation depicted in FIG. 3). Above the midpoint pneumatic drive signal value, the force exerted by the pneumatic drive signal 66 overcomes the force exerted by the spring 76, and the spool 52 moves toward the spring module 70 (i.e., left in the orientation depicted in FIG. 3)

Figure 4:
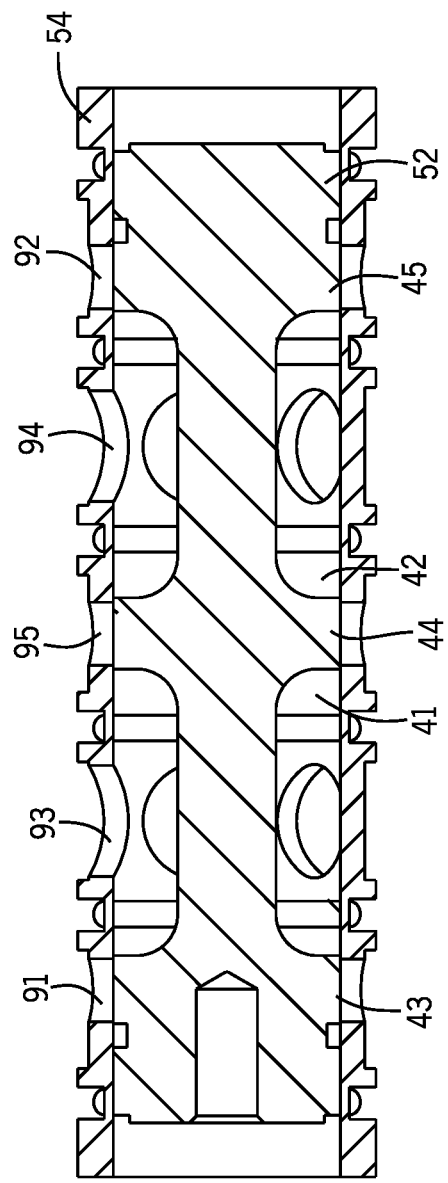
FIGS. 4-7 are cross-sectional views of a spool valve in different positions in accordance with an embodiment of this disclosure.

FIG. 4 is a cross-sectional view of the spool valve 50. The sleeve 54 is a cylindrical conduit within which the spool 52 moves axially according to the pneumatic signal 66. Groups of holes that extend through the wall of the sleeve 54 and wrap around its circumference are positioned at each of multiple axial locations along the sleeve 54. The groups of holes (which are each collectively referred to herein as a port) that are positioned nearest the ends of the sleeve 54 include a first vent port 91 and a second vent port 92 that couple the interior of the sleeve 54 with the DVC 11's vent 15. A first cylinder port 93 and a second cylinder port 94 are positioned toward the axial midpoint of the sleeve 54 from the vent ports 91, 92. The first cylinder port 93 and second cylinder port 94 couple the interior of the sleeve 54 with a first DVC cylinder port and a second DVC cylinder port of the DVC 11, respectively. The first and second DVC cylinder ports are ultimately coupleable to the first cylinder 13 of the actuator 12' and the second cylinder 14 of the actuator 12' such that each actuator cylinder is coupled to the interior of the sleeve 54 proximate to its respective cylinder port 93, 94. Finally, a supply port 95 couples the interior of the sleeve 54 with a DVC supply port of the DVC 11, which DVC supply port is ultimately coupleable to the pneumatic supply 20 to the DVC 11 such that the supply pressure is fluidly coupled to the interior of the sleeve 54 proximate to the supply port 95.

The spool 52 is a cylindrical component that includes a first annular chamber 41 and a second annular chamber 42. The first annular chamber 41 is bounded by a first sealing portion 43 and a central sealing portion 44 of the spool 52. The second annular chamber 42 is bounded by a second sealing portion 45 and the central sealing portion 44. The first, second, and central sealing portions 43, 44, 45 each sealingly engage the interior of the sleeve 54. Depending on the position of the spool 52 within the sleeve 54, the spool 52 acts to isolate or couple neighboring pairs of the ports in the sleeve. For example, in the position shown in FIG. 4, which corresponds to the equilibrium position in which the valve position matches the valve position setpoint signal 60 (and thus the DVC 11 is simply maintaining the pressure in each of the actuator's first 13 and second 14 cylinders), the first and second sealing portions of the spool 43, 45 isolate the first and second cylinder ports 93, 94 from the first and second vent ports 91, 92 and the central sealing portion 44 isolates the first and second cylinder ports 93, 94 from the supply port 95. In this position, no supply pressure is communicated to either cylinder of the actuator 12' and neither cylinder is vented. As a result, the pressure in the first and second cylinders of the actuator 12' is maintained at a current value, and (assuming process conditions acting upon the valve member are constant) the valve position remains constant.

Figure 5:
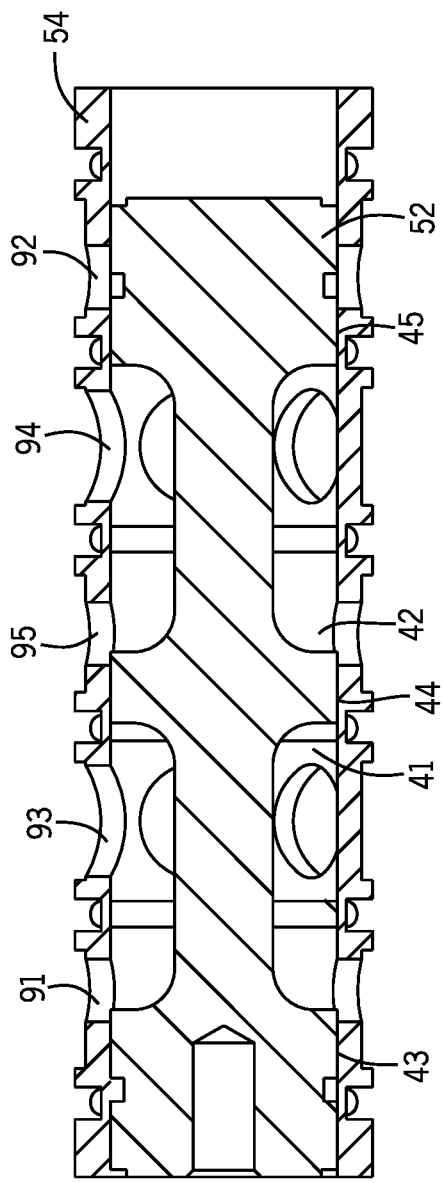

In the position shown in FIG. 5, the spool 52 is shifted toward the spring module 70 from the position shown in FIG. 4. This spool valve position is attained, for example, when the valve position feedback signal 62 indicates that the valve 8 is not open to the degree requested by the valve position setpoint signal 60, and, therefore, the DVC 11 needs to act to move the valve member toward the open position (it will be understood that the terms open and closed are arbitrary and are used here only for explanatory purposes). To accomplish this, the logic executed by control circuitry on the PCB 32 results in an increased electric drive signal 64 (relative to the electric drive signal 64 that results in the spool valve position illustrated in FIG. 4), which, in turn, results in a pneumatic drive signal 66 above the midpoint value that exerts a force on the spool 52 that overcomes the force exerted by the spring 76, shifting the spool 52 toward the spring module 70. In this position, the first annular chamber 41 couples the first cylinder port 93 to the first vent port 91 and the second annular chamber 42 couples the second cylinder port 94 to the supply port 95. The effect of this spool valve position is that high pressure supply fluid flows from the DVC supply port to the second cylinder 14 of the actuator 12' to increase the pressure in the second cylinder 14, and, simultaneously, pressure is exhausted from the first cylinder 13 of the actuator 12' through the first vent port 91 and the DVC 11's vent 15. Consequently, the piston 16 moves toward the first cylinder 13 causing the connected valve member to move toward the open position.

Figure 6:
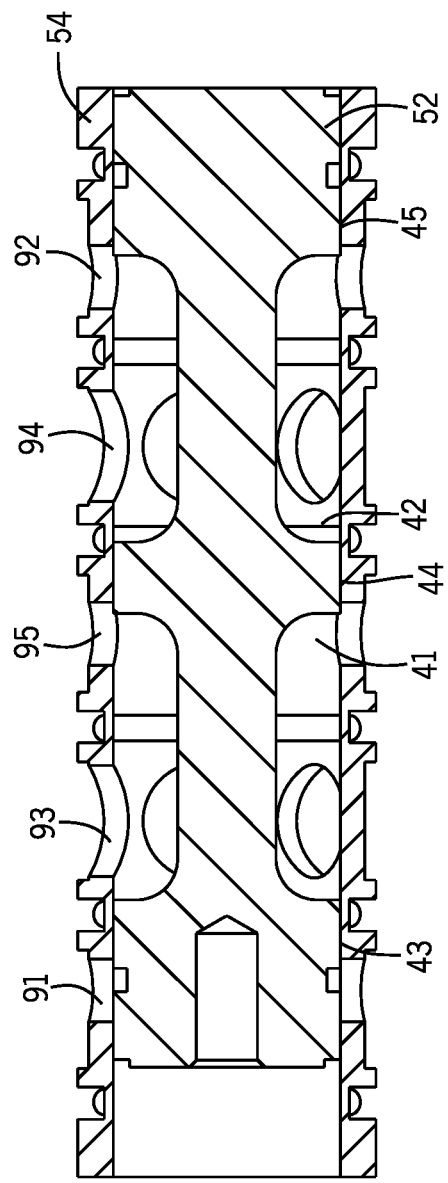

In the position shown in FIG. 6, the spool 52 is shifted toward the power module 80 from the position shown in FIG. 4. This spool valve position is attained, for example, when the valve position feedback signal 62 indicates that the valve 8 is opened to a greater degree than what is requested by the valve position setpoint signal 60, and, therefore, the DVC 11 needs to act to move the valve member toward the closed position. To accomplish this, the logic executed by control circuitry on the PCB 32 results in a decreased electric drive signal 64 (relative to the electric drive signal 64 that results in the spool valve position illustrated in FIG. 4), which, in turn, results in a pneumatic drive signal 66 below the midpoint value that exerts a force on the spool 52 that is less than the force exerted by the spring 76, shifting the spool 52 toward the power module 80. In this position, the first annular chamber 41 couples the first cylinder port 93 to the supply port 95 and the second annular chamber 42 couples the second cylinder port 94 to the second vent port 92. The effect of this spool valve position is that high pressure supply fluid flows from the DVC supply port to the first cylinder 13 of the actuator 12' to increase the pressure in the first cylinder 13, and, simultaneously, pressure is exhausted from the second cylinder 14 of the actuator 12' through the second vent port 92 and the DVC 11's vent 15. Consequently, the piston 16 moves toward the second cylinder 14 causing the connected valve member to move toward the closed position.

Figure 7:
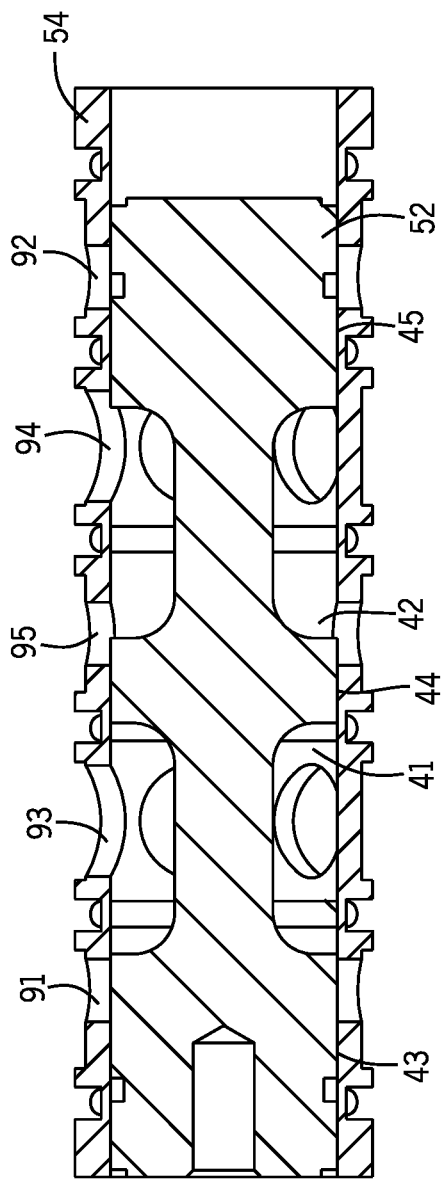

Through this mechanism, the spool valve 50 enables the DVC 11 to precisely control the balance of forces acting on the piston 16 in the double-acting actuator 12' and thus to precisely control a connected valve's position to a setpoint value. However, the inventors have observed that minor discrepancies in the manufacturing of the spool 52 and sleeve 54 can significantly impact the performance of the spool valve 50 and thus make precise control of valve position difficult. This problem is illustrated in FIG. 7, in which the axial length of the first and second annular chambers 41, 42 are slightly smaller than the desired dimensions. As illustrated, the DVC 11 is attempting to move the valve 8 toward the open position by increasing the pressure in the second cylinder 14 and decreasing the pressure in the first cylinder 13. Accordingly, the pneumatic drive signal 66 delivered to the spool valve 50's drive module 80 is greater than the midpoint value, causing the spool 52 to shift toward the spring module 70 (as shown in FIG. 5). However, because the dimensions of the first and second annular chambers 41, 42 are slightly different than the desired values, while the second annular chamber 42 couples the second cylinder port 94 to the supply port 95, the first annular chamber 41 does not couple the first cylinder port 93 to the first vent port 91. Consequently, supply pressure is delivered to the second cylinder 14 but the first cylinder 13 is not simultaneously vented. The increasing pressure in the second cylinder 14 operates on the piston 16, but the fluid within the first cylinder 13 has nowhere to go; therefore, the movement of the valve member is not as expected. When the spool 52 finally does get to a position in which the first annular chamber 41 permits the first cylinder 13 to be vented, the unexpected cylinder pressures can cause the DVC 11 to overshoot the setpoint (e.g., to open the valve member beyond the degree that is called for by the valve position setpoint signal 60). The result of the dimensional differences in different spool pieces can therefore lead to suboptimal control of valve position. While dimensional variances in the spool 52 components could be reduced with tighter machine tolerances, such precise dimensional requirements can be difficult to attain and can lead to significantly increased component cost. The inventors have therefore devised a solution that permits spool components to be adjusted before being assembled into the spool valve 50.

Figure 8:
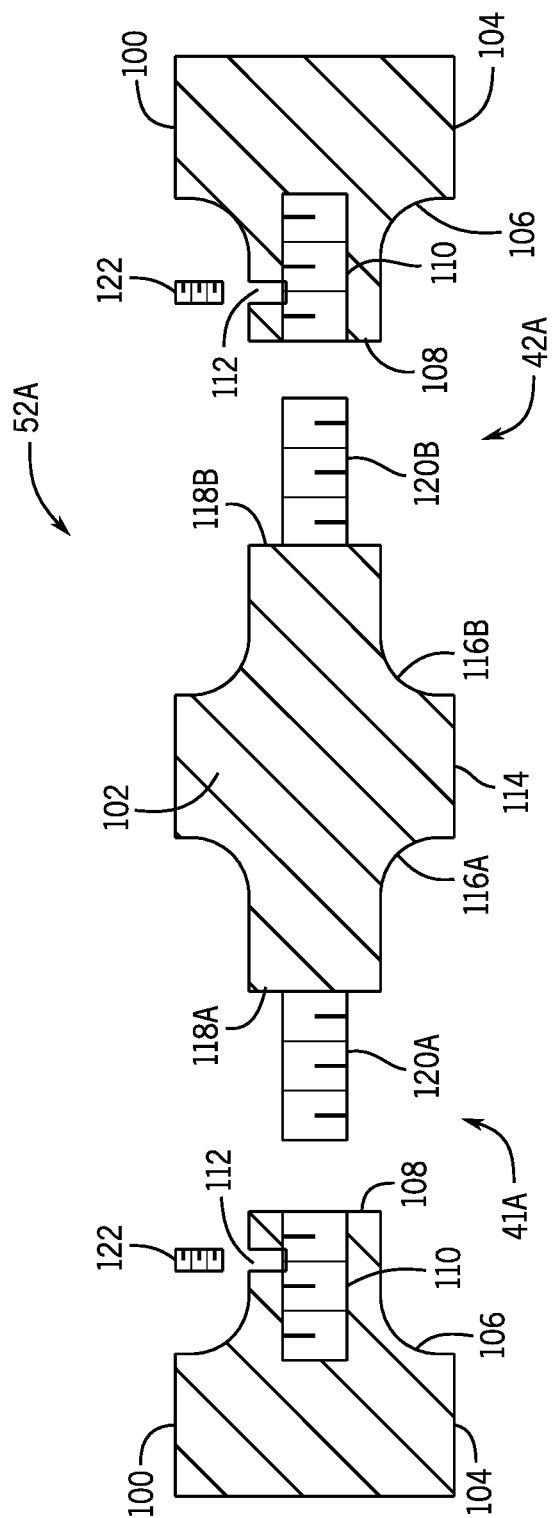
FIGS. 8-12 are cross-sectional views of adjustable spool components for a spool valve in accordance with different embodiments of this disclosure.

FIG. 8 illustrates an adjustable spool 52A. The adjustable spool component 52A includes three separate spool sub-components: first and second end components 100 (which may be identical in construction) and a center component 102. The end components 100 include a cylindrical end sealing portion 104 and an end chamber portion 106 that has a smaller diameter than the end sealing portion 104. The end chamber portion 106 of the end components terminates at an end engagement face 108. The end engagement face 108 includes an internally threaded recess 110 that extends toward the end sealing portion 104. One or more set screw bores 112 extend transverse to the recess 110 through the end chamber portion 106. The center component 102 includes a cylindrical center sealing portion 114 and two center chamber portions 116A, 116B that have a smaller diameter than the center sealing portion 114. The center chamber portions 116A, 116B terminate at center engagement faces 118A and 118B, respectively, and externally threaded protruding members 120A and 120B extend from the center engagement faces 118A and 118B, respectively, in directions away from the center sealing portion 114 and opposite each other.

The adjustable spool component 52A is assembled with an end component 100 being threaded onto each of the center component 102's protruding members 120A, 120B. The amount of engagement of protruding members 120A, 120B with the recesses 110 permits the position of the end components 100 to be adjusted relative to the center component 102 to establish first and second annular chambers 41A, 42A having precise dimensions to match a corresponding sleeve 54. When the desired positions of the end components 100 relative to the center component 102 are established, each end component 100's position is locked in place relative to the center component 102 by threading a set screw 122 into the set screw bore 112 to engage the protruding member 120A, 120B.

Figure 9:
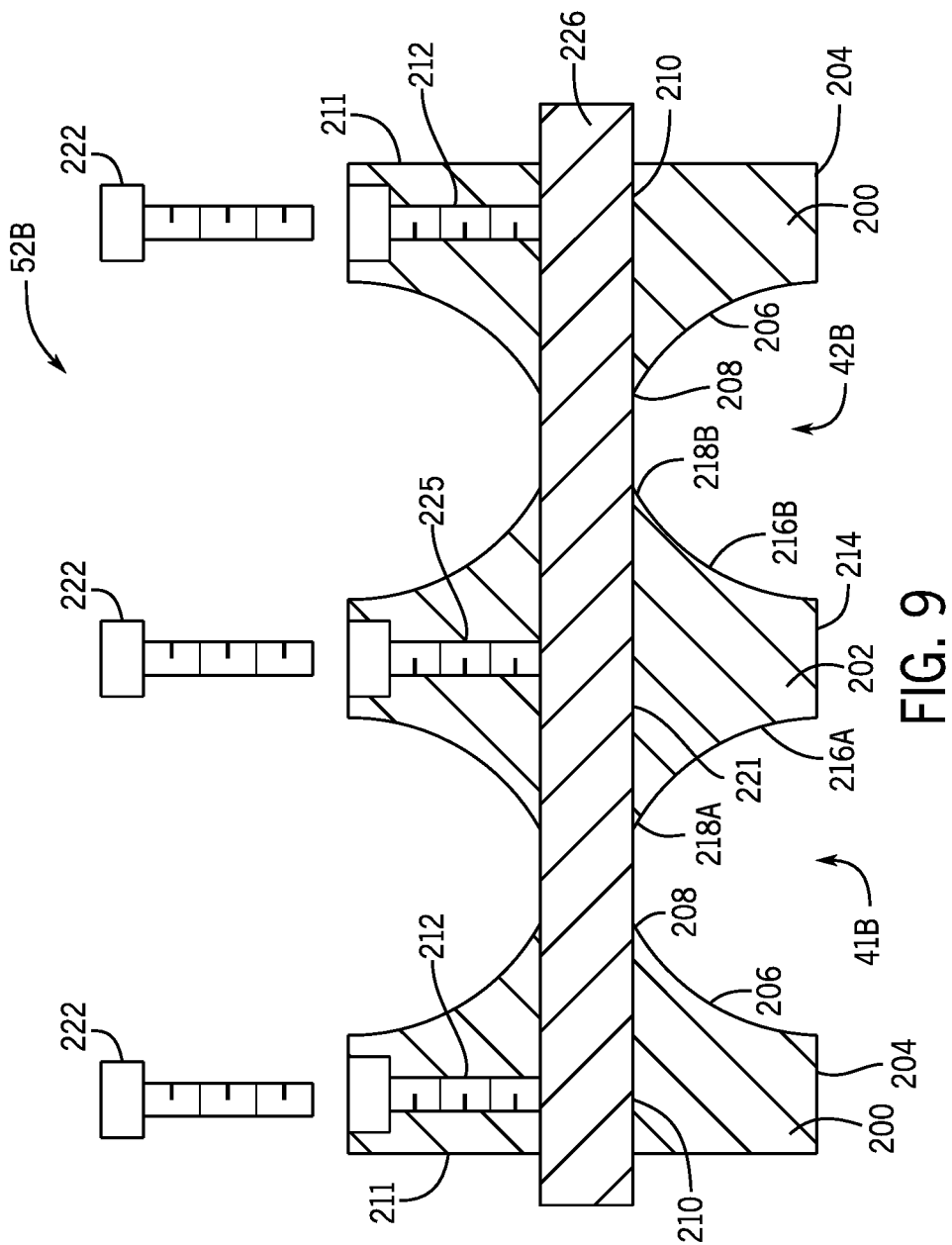

FIG. 9 illustrates an adjustable spool 52B. The adjustable spool component 52B includes three separate spool sub-components: first and second end components 200 (which may be identical in construction) and a center component 202. The end components 200 include a cylindrical end sealing portion 204 and an end chamber portion 206 that has a smaller diameter than the end sealing portion 204. The end chamber portion 206 of the end components 200 terminates at an end engagement face 208. An end through-bore 210 extends from the end engagement face 208 through the end component 200 to an end outer face 211. One or more set screw bores 212 extend transverse to the end through-bore 210 through the end sealing portion 204. The center component 202 includes a cylindrical center sealing portion 214 and two center chamber portions 216A, 216B that have a smaller diameter than the center sealing portion 214. The center chamber portions 216A, 216B terminate at center engagement faces 218A and 218B, respectively. A center through-bore 221 extends through the center component 202 from center engagement face 218A to center engagement face 218B. One or more set screw bores 225 extend transverse to the center through-bore 221 through the center sealing portion 214.

The adjustable spool component 52B is assembled with the center component 202 and two end components 200, positioned with end engagement faces 208 toward center engagement faces 218A, 218B, installed on a rod 226 that extends through the through-bores 210, 221 of each of the components 200, 202. The rod 226 may be either a smooth rod (in which case the through-bores 210, 221 have a smooth interior wall) or an externally threaded rod (in which case the through-bores 210, 221 have a matching internal thread), and its length is approximately the length of the assembled spool component 52B while permitting small adjustment to the positions of the components 200, 202. The through-bores 210, 221 permit the position of the end components 200 to be adjusted relative to the center component 202 to establish first and second annular chambers 41B, 42B having precise dimensions to match a corresponding sleeve 54. When the desired positions of the end components 200 and the center component 202 are established, the positions of each end component 200 and the center component 202 are locked in place by threading a set screw 222 into the set screw bores 212, 225 to engage the rod 226.

Figure 10:
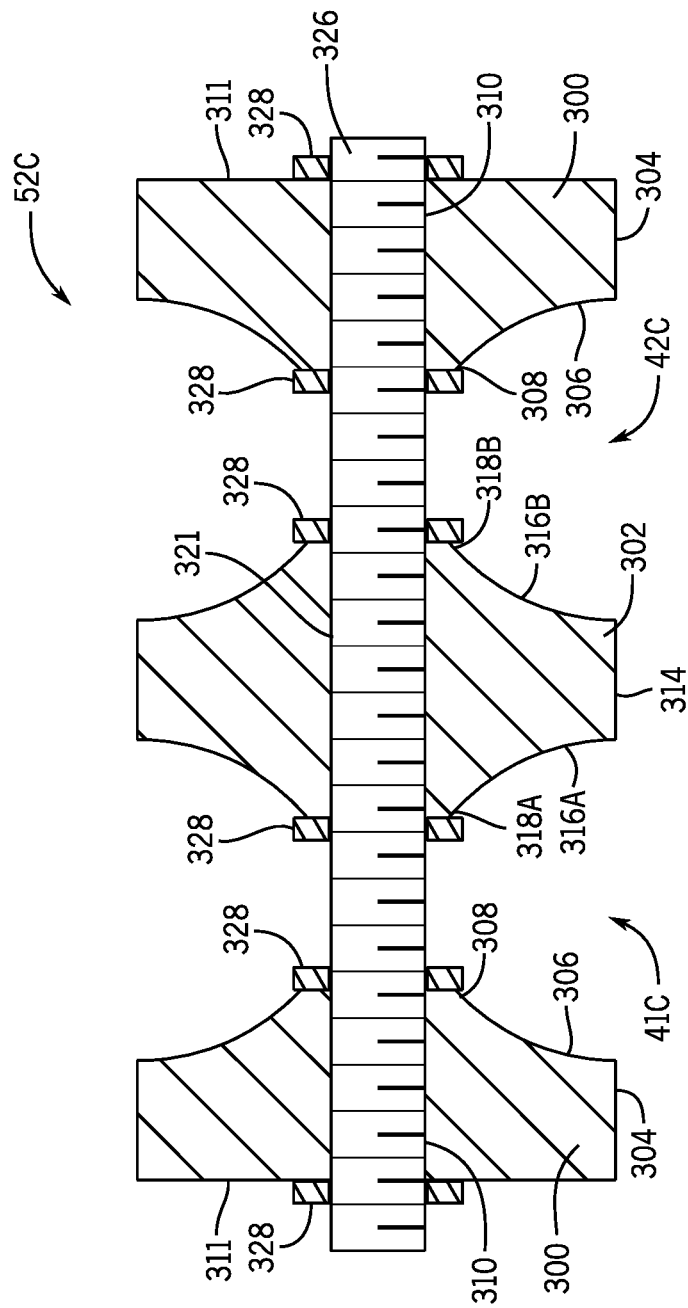

FIG. 10 illustrates an adjustable spool 52C. The adjustable spool component 52C includes three separate spool sub-components: first and second end components 300 (which may be identical in construction) and a center component 302. The end components 300 include a cylindrical end sealing portion 304 and an end chamber portion 306 that has a smaller diameter than the sealing portion 304. The end chamber portion 306 of the end components terminates at an end engagement face 308. An internally threaded end through-bore 310 extends from the end engagement face 308 through the end component 300 to an end outer face 311. The center component 302 includes a cylindrical center sealing portion 314 and two center chamber portions 316A, 316B that have a smaller diameter than the center sealing portion 314. The center chamber portions 316A, 316B terminate at center engagement faces 318A and 318B, respectively. An internally threaded center through-bore 321 extends through the center component 302 from center engagement face 318A to center engagement face 318B.

The adjustable spool component 52C is assembled with the center component 302 and two end components 300, positioned with end engagement faces 308 toward center engagement faces 318A, 318B, threaded onto an externally threaded rod 326 that extends through the through-bores 310, 321 of each of the components 300, 302. Lock nuts 328 are positioned on each side of each of the components 300, 302 on the rod 326. The through-bores 310, 321 permit the position of the end components 300 to be adjusted relative to the center component 302 to establish first and second annular chambers 41C, 42C having precise dimensions to match a corresponding sleeve 54. When the desired positions of the end components 300 and the center component 302 are established, the positions of each end component 300 and the center component 302 are locked in place by tightening the lock nuts 328 on each side of each component 300, 302 to prevent movement of the components 300, 302 along the rod 326.

Figure 11:
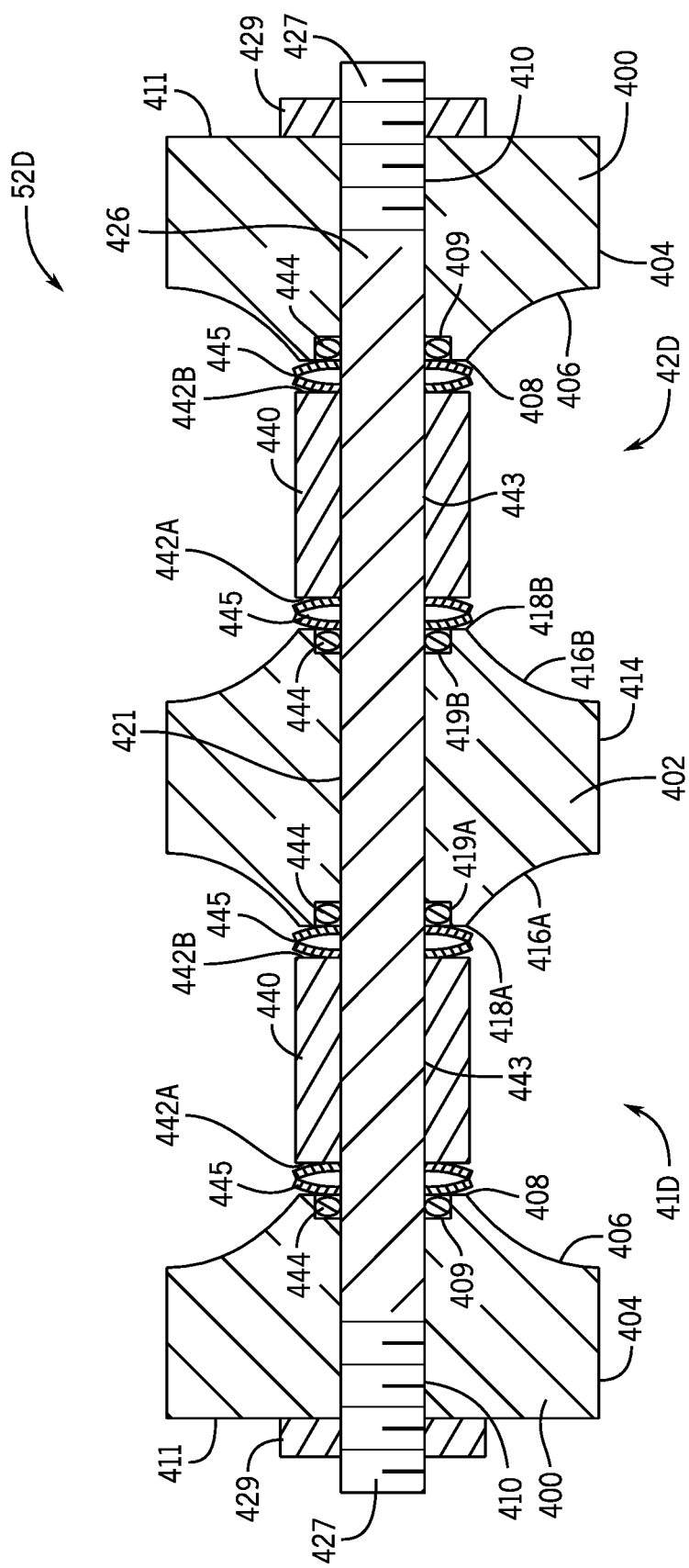

FIG. 11 illustrates an adjustable spool 52D. The adjustable spool component 52D includes five separate spool sub-components: first and second end components 400 (which may be identical in construction), a center component 402, and first and second spacers 440 (which may also be identical in construction). The end components 400 include a cylindrical end sealing portion 404 and an end chamber portion 406 that has a smaller diameter than the end sealing portion 404. The end chamber portion 406 of the end components 400 terminates at an end engagement face 408. An end through-bore 410 extends from the end engagement face 408 through the end component 400 to an end outer face 411. A stopped counter-bore 409 is centered on the end through-bore 410 and extends into the end engagement face 408. The center component 402 includes a center sealing portion 414 and two center chamber portions 416A, 416B that have a smaller diameter than the center sealing portion 414. The center chamber portions 416A, 416B terminate at center engagement faces 418A and 418B, respectively. A center through-bore 421 extends through the center component 402 from center engagement face 418A to center engagement face 418B. Stopped counter-bores 419A, 419B are centered on the center through-bore 421 and extend into each center engagement face 418A, 418B. Spacers 440 are cylindrical components having opposing engagement faces 442A, 442B and a spacer through-bore 443 that extends from spacer engagement face 442A to spacer engagement face 442B.

The adjustable spool component 52D is assembled with the five spool components arranged on a smooth rod 426 having external threaded portions 427 at each end. A spacer 440 is positioned on each side of the center component 402, and the first and second end components 400 are positioned adjacent to the spacers 440 with the end engagement faces 408 facing toward the center component 402. Sealing members 444 (such as O-rings) are positioned in each of the counter-bores 409, 419A, 419B and disc springs 445 (such as Belleville washers) are positioned on each side of each spacer 440. Adjusting nuts 429 are threaded onto the threaded end portions 427 of the rod 426 and contact the end outer face 411 of each end component 400. The flexibility of the disc springs 445 enable the positions of the components to be adjusted along the rod 426 by tightening or loosening the adjusting nuts 429 to compress and/or expand the disc springs 445. In this manner, the positions of the end components 400 may be adjusted relative to the center component 402 to establish first and second annular chambers 41D, 42D having precise dimensions to match a corresponding sleeve 54. The disc springs 445 additionally provide a sealing surface that contacts and compresses the sealing members 444, which prevents fluid leakage between the first and second annular chambers 41D, 42D.

Figure 12:
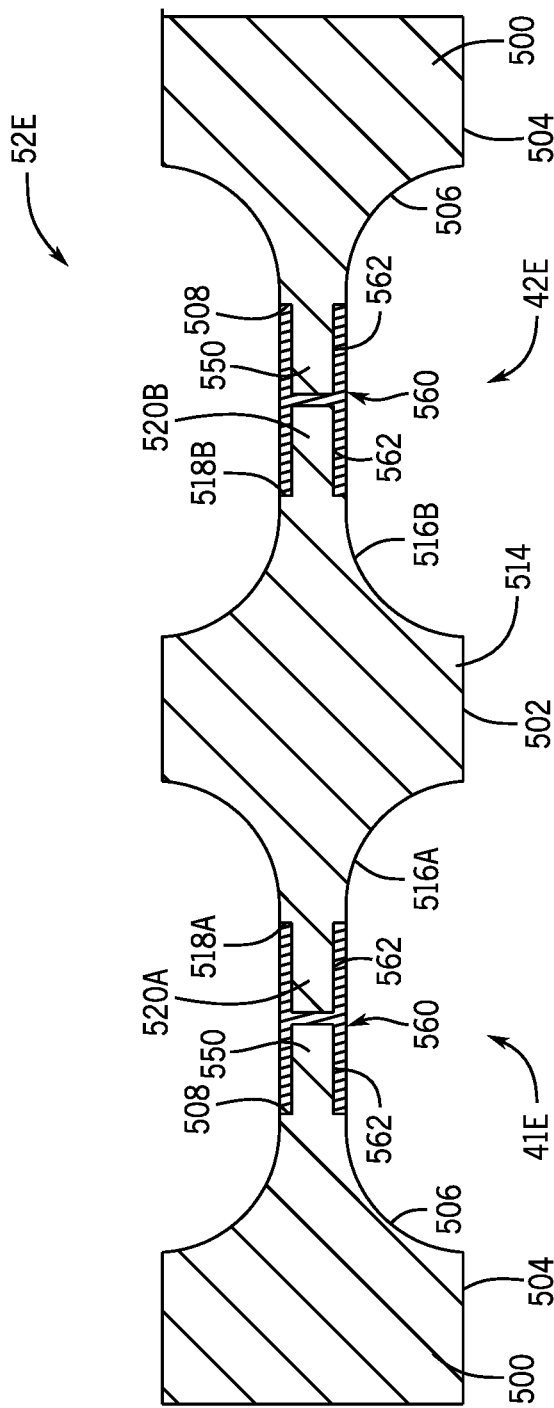

FIG. 12 illustrates an adjustable spool 52E. The adjustable spool component 52E includes three separate spool sub-components: first and second end components 500 (which may be identical in construction) and a center component 502. The end components 500 include a cylindrical end sealing portion 504 and an end chamber portion 506 that has a smaller diameter than the end sealing portion 504. The end chamber portion 506 of the end components 500 terminate at an end engagement face 508, and a protruding member 550 extends from the end engagement face 508 in a direction away from the end sealing portion 504. The center component 502 includes a cylindrical center sealing portion 514 and two center chamber portions 516A, 516B that have a smaller diameter than the center sealing portion 514. The center chamber portions 516A, 516B terminate at center engagement faces 518A and 518B, respectively, and protruding members 520A and 520B extend from the center engagement faces 518A and 518B, respectively, in directions away from the center sealing portion 514 and opposite each other.

In addition to the three spool components, the adjustable spool component 52E includes two connection collars 560. Each connection collar 560 is a cylindrical component having stopped bores that form receptacles 562 at opposing ends of the collar 560. In an alternative embodiment, the stopped bores that form receptacles 562 may be configured as a single through-bore. The receptacles 562 are sized to receive the protruding members 550, 520A, and 520B. The adjustable spool component 52E is assembled with the center component 502 being joined by a connection collar 560 to an end component 500 on each side of the center component 502. With the protruding members 550, 520A, and 520B positioned within the receptacles 562 of the connection collars 560, the position of the end components 500 can be adjusted relative to the center component 502 to establish first and second annular chambers 41E, 42E having precise dimensions to match a corresponding sleeve 54. When the components are positioned in the desired positions, they can be bonded together such as via welding, chemical bonding, etc.

Each of the adjustable spool components 52A-52E can be adjusted to precisely cooperate with a corresponding sleeve 54 to prevent the above-described limitations of a non-adjustable spool 52. With each of the adjustable spool components 52A-52E, a jig may be utilized to precisely align the spool components in the appropriate positions.

While the invention herein disclosed has been described in terms of specific embodiments and applications thereof, numerous modifications and variations could be made thereto by those skilled in the art without departing from the scope of the invention set forth in the claims.

What is claimed is:

1. An adjustable spool component for a spool valve, comprising:
    a center component having a center sealing portion, a first center chamber portion, and a second center chamber portion, wherein the first and second center chamber portions are on opposite sides of the center sealing portion;
    a first end component having a first end sealing portion and a first end chamber portion; and
    a second end component having a second end sealing portion and a second end chamber portion;
    wherein the first end component is spaced apart from the center component to a first side of the center component, the second end component is spaced apart from the center component to a second side of the center component that is opposite the first side, and a position of each of the first and second end components is threadedly adjustable relative to the center component to change the spacing between the center component and, respectively, the first and second end components.

2. The adjustable spool component of claim 1, wherein:
    the center component comprises a first threaded protrusion and a second threaded protrusion;
    the first end component comprises a first threaded recess; and
    the second end component comprises a second threaded recess;

wherein the first threaded recess is configured to receive the first threaded protrusion and the second threaded recess is configured to receive the second threaded protrusion, and wherein the position of the first end component is adjustable relative to the center component based on an amount of engagement between the first threaded protrusion and the first threaded recess and the position of the second end component is adjustable relative to the center component based on an amount of engagement between the second threaded protrusion and the second threaded recess.

3. The adjustable spool component of claim 2, wherein each of the first and second end components comprises a set screw bore that is configured to receive a set screw.

4. The adjustable spool component of claim 1, wherein:
the first end component comprises a first axial through-bore;
the second end component comprises a second axial through-bore;
the center component comprises a center axial through-bore; and
wherein the first end component, the second end component, and the center component are positioned on a threaded rod that extends through the first axial through-bore, the second axial through-bore, and the center axial through-bore.

5. The adjustable spool component of claim 4, wherein the center component is threadedly adjustable along the threaded rod to change the spacing between the center component and the first and second end components.

6. The adjustable spool component of claim 5, wherein each of the first end component, the second end component, and the center component comprises a set screw bore that is configured to receive a set screw.

7. The adjustable spool component of claim 5, further comprising a plurality of lock nuts that are threaded onto the threaded rod and positioned adjacent to the center component, the first end component, and the second end component to secure the center component, the first end component, and the second end component with select spacing relative to each other along the threaded rod.

8. The adjustable spool component of claim 5, wherein the rod comprises threaded ends.

9. A spool valve, comprising:
a sleeve having a plurality of ports that are positioned at different axial locations along the sleeve; and
an adjustable spool component that is configured to fluidly connect or isolate different ones of the plurality of ports based on a position of the adjustable spool component within the sleeve, the adjustable spool component comprising:
a center component having a center sealing portion, a first center chamber portion, and a second center chamber portion, wherein the first and second center chamber portions are on opposite sides of the center sealing portion;
a first end component having a first end sealing portion and a first end chamber portion; and
a second end component having a second end sealing portion and a second end chamber portion,
wherein the first end component is positioned on a first side of the center component to define a first annular chamber within the sleeve to control flow through the plurality of ports, the second end component is positioned on a second side of the center component that is opposite the first side to define a second annular chamber within the sleeve to control flow through the plurality of ports, and a position of each of the first and second end components is threadedly adjustable relative to the center component to change a size, respectively, or the first and second annular chambers.

10. The spool valve of claim 9, wherein one port of the plurality of ports is configured to be coupled to a pneumatic supply pressure.

11. The spool valve of claim 10, wherein two or more of the plurality of ports are configured to be coupled to an atmosphere surrounding the spool valve.

12. The spool valve of claim 10, wherein two or more of the plurality of ports are configured to be coupled to cylinders of a pneumatic actuator.

13. The spool valve of claim 9, wherein the position of the adjustable spool component within the sleeve is dependent upon a pneumatic signal that is supplied by a digital valve controller.

14. The spool valve of claim 9, wherein the first end component, the second end component, and the center component are positioned on a rod that extends through a first axial through-bore that extends through the first end component, a second axial through-bore that extends through the second end component, and a center axial through-bore that extends through the center component;
the spool valve further comprising one or more of:
a first set of lock nuts threadedly secured to the rod to secure the first end component at any of a plurality of locations along the rod;
a second set of lock nuts threadedly secured to the rod to secure the second end component at any of a plurality of locations along the rod; or
a third set of lock nuts threadedly secured to the rod to secure the center component at any of a plurality of locations along the rod.

* * * * *